(12) United States Patent
Pulek

(10) Patent No.: US 6,464,084 B2
(45) Date of Patent: Oct. 15, 2002

(54) EDGE SEAL FOR FILTER CARTRIDGE

(75) Inventor: John L. Pulek, Cheshire, CT (US)

(73) Assignee: Cuno Incorporated, Meriden, CT (US)

( * ) Notice: Subject to any disclaimer, the term of this patent is extended or adjusted under 35 U.S.C. 154(b) by 0 days.

(21) Appl. No.: 09/779,393

(22) Filed: Feb. 8, 2001

(65) Prior Publication Data

US 2001/0013493 A1 Aug. 16, 2001

Related U.S. Application Data

(63) Continuation of application No. 09/135,489, filed on Aug. 17, 1998, now abandoned.

(51) Int. Cl.⁷ .............................................. B01D 29/05
(52) U.S. Cl. .................................... 210/486; 210/500.1
(58) Field of Search ................................ 210/486, 487, 210/500.1

(56) References Cited

U.S. PATENT DOCUMENTS

| | | |
|---|---|---|
| 2,444,147 A | 6/1948 | Walton |
| 2,788,901 A | 4/1957 | Boeddinghaus |
| 4,347,208 A | 8/1982 | Southall |
| 4,948,561 A | 8/1990 | Hinckley et al. |
| 5,316,678 A * | 5/1994 | Heaslip ...................... 210/486 |
| 5,472,537 A * | 12/1995 | Friel et al. ..................... 156/69 |

FOREIGN PATENT DOCUMENTS

RU      788480    *  7/1992 ................. 210/486

OTHER PUBLICATIONS

SEITZ–SUPRAdisc® with SEITZ–VELAdisc®, date unknown.
SWK–VELAdisc® SWK–SUPRAdisc® May 1991.

* cited by examiner

Primary Examiner—Matthew O. Savage
(74) Attorney, Agent, or Firm—Cummings & Lockwood

(57) ABSTRACT

A fluid filtration cell is disclosed which includes a separator disposed between two media elements having outer peripheries which are secured together by an edge seal. The media elements are formed from a material which swells in size due to fluid absorption. The edge seal is formed from a thermoplastic material having a modulus of elasticity which is sufficient to permit radial expansion of the edge seal when the cell media swells in size.

14 Claims, 3 Drawing Sheets

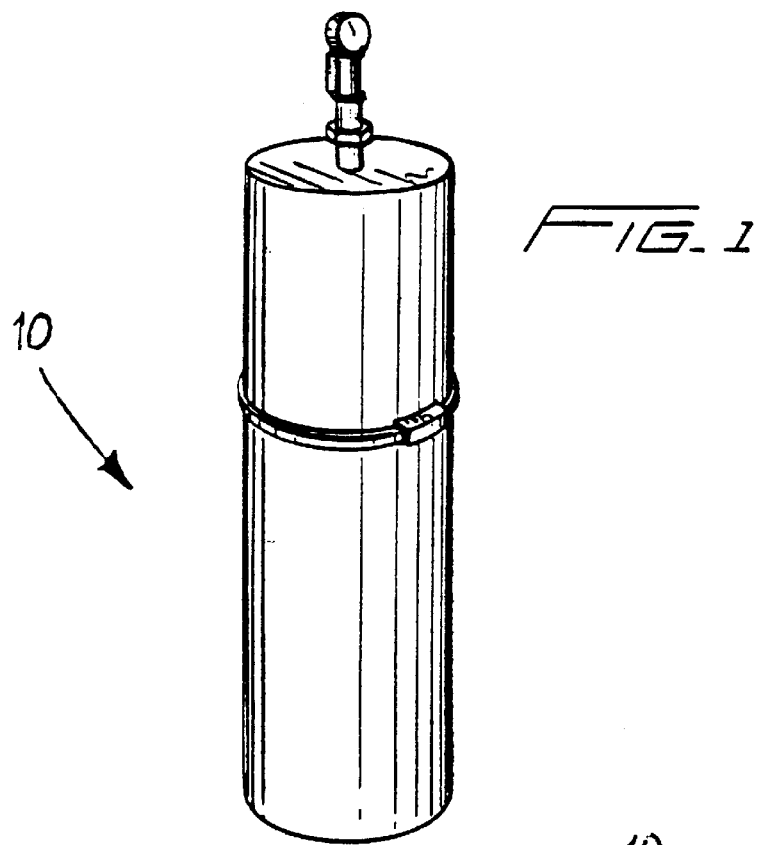
FIG_1
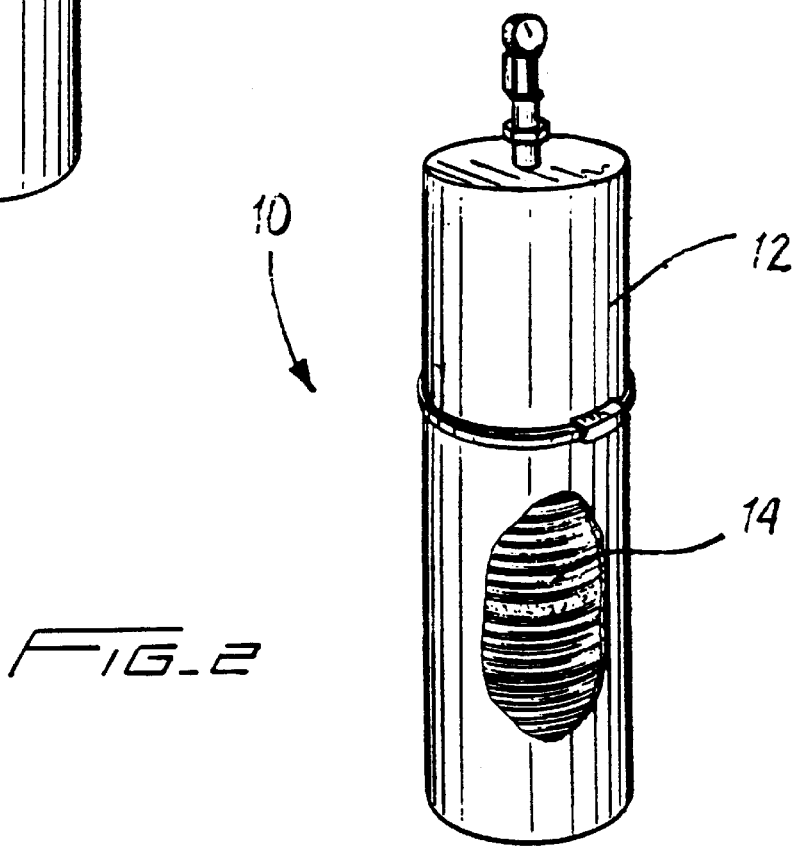
FIG_2

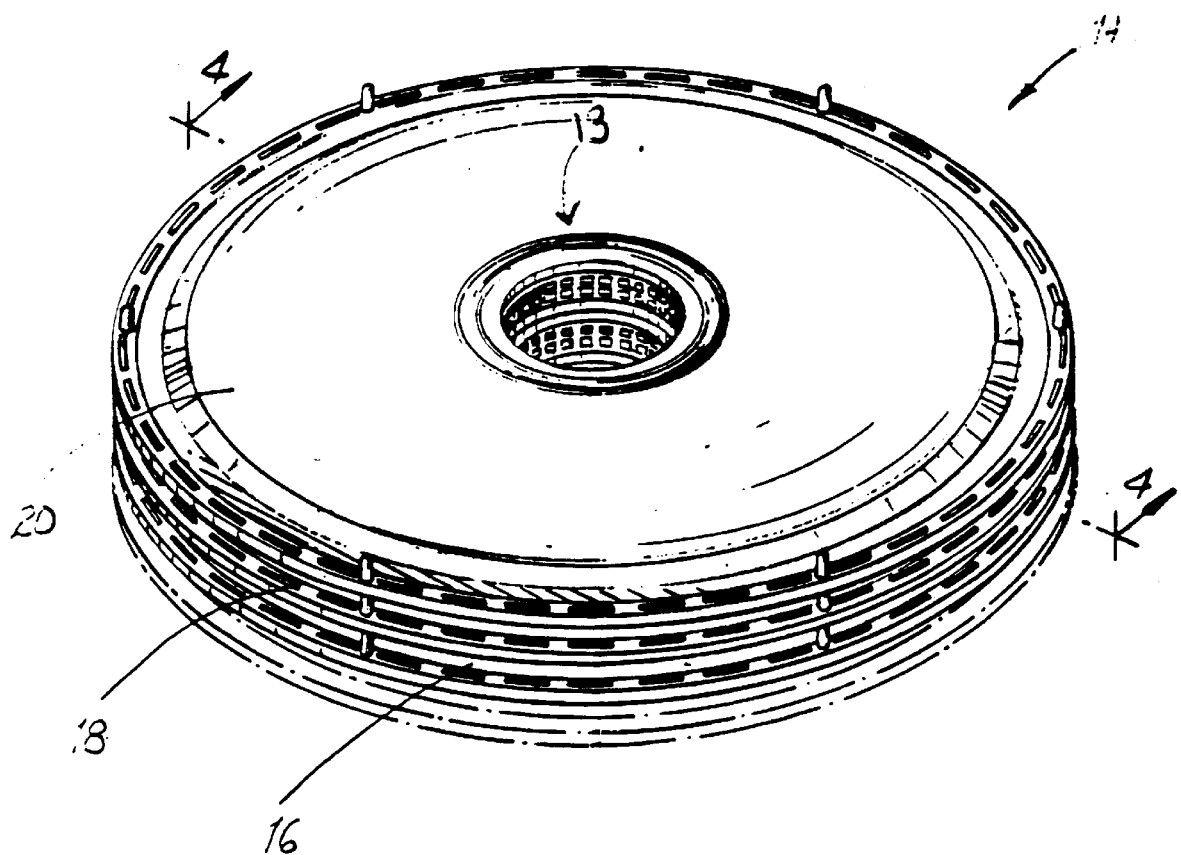
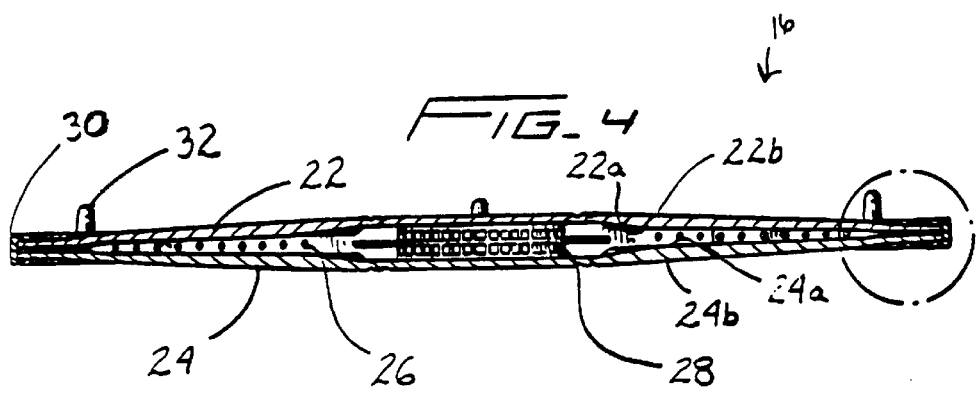

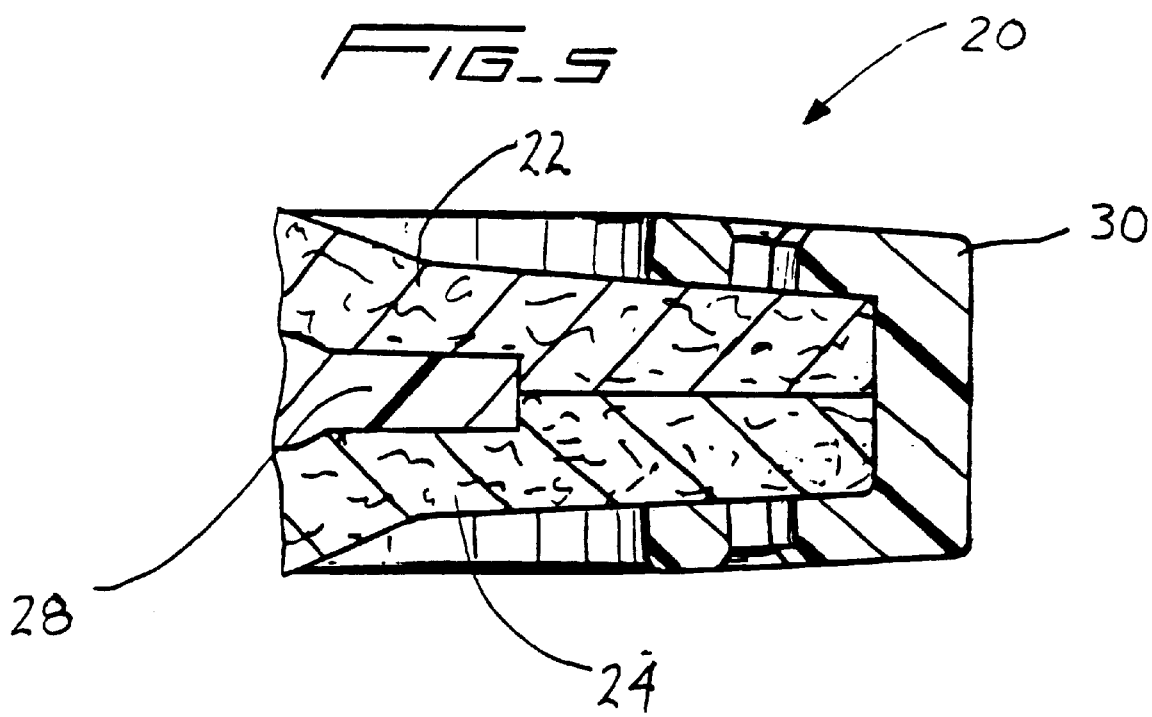
FIG_5
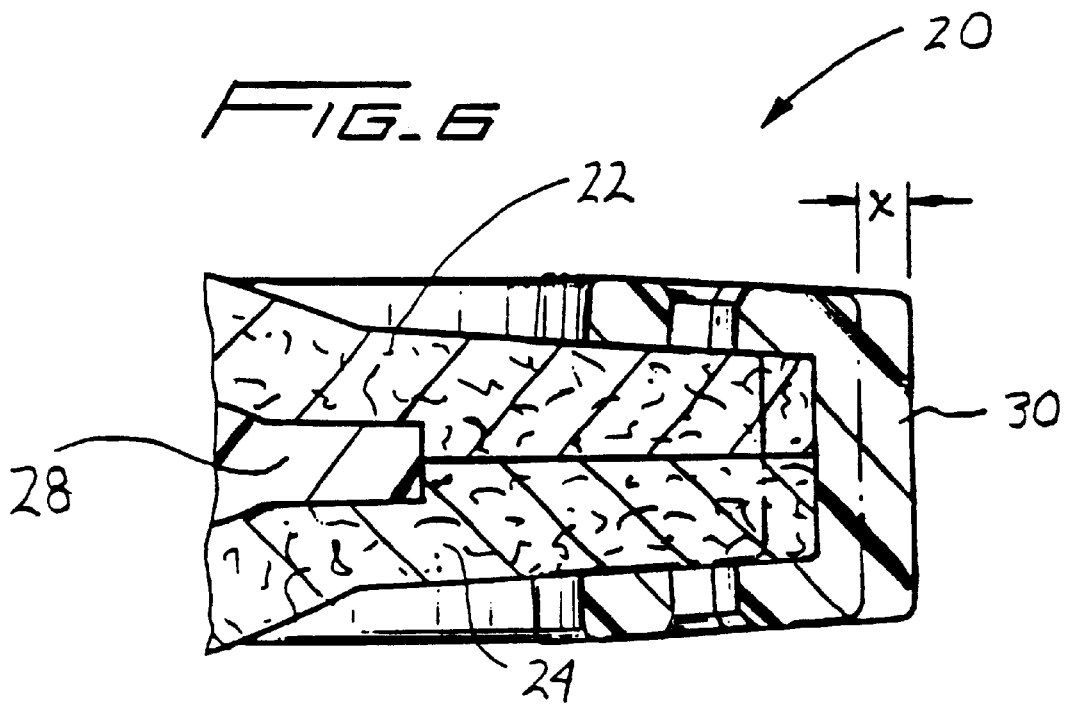
FIG_6

EDGE SEAL FOR FILTER CARTRIDGE

This application is a continuation of U.S. patent application Ser. No. 09/135,489 filed on Aug. 17, 1998, now abandoned.

BACKGROUND OF THE INVENTION

1. Field of the Invention

The subject invention is related to a cell-type filter cartridge, and more particularly, to a filtration cell having a very low tendency toward media buckling resulting from the inclusion therein of a thermoplastic edge seal having certain desirable mechanical characteristics.

2. Background of the Related Art

Cell-type filter assemblies, often referred to as lenticular filter assemblies, are well known in the art and have been employed in fluid processing systems for many years. An early example is disclosed in U.S. Pat. No. 2,788,901 to Boeddinghaus et al. Lenticular filter assemblies often include a plurality of vertically-stacked, co-axially arranged, filtration cells disposed within a cylindrical housing. The filtration cells are conventionally fabricated from two disc-shaped layers of filter media separated from each other such that liquid flows from the outside of the filter medium into the space between the layers of filtration media towards the central portion of the cell. The filter media discs are typically formed from cellulosic fibers. The separators are generally formed in the shape of discs with a plurality of ribs extending radially outward from a central aperture in a spoke-like pattern. An example of a lenticular filtration cell having such a construction is disclosed in U.S. Pat. No. 4,783,262 to Ostreicher et al., assigned to the assignee of the present application, the disclosure of which is herein incorporated by reference.

In prior art cells of this type, the two media discs are joined together by a thermoplastic edge seal which grips the two media layers to form a liquid tight seal at the outer periphery of the cell. U.S. Pat. No. 4,347,208 to Southall discloses a method of making a filtration cell having a sealed periphery which includes the steps of placing two media discs and an interposed separator into a mold and injecting a thermoplastic polymer into the mold to form a seal around the two media discs. The Southall patent discloses that polypropylene, polyethylene, nylon, and polysulfone are the preferred thermoplastic polymers for molding the edge seal, all of which have a relatively high elastic modulus.

It is known that thermoplastic edge seals formed by injection molding undergo radial shrinkage when cooled after solidification. This shrinkage induces a compressive radial stress in the filter media, thus increasing the tendency towards buckling in use, a condition wherein the cell media layers deflect in a vertical plane. Furthermore, conventionally such thermoplastic edges are molded around a dry, solid, media discs, resulting in a thermoplastic ring diameter larger than if thermoplastic material was molded and then allowed to cool unrestrained. Therefore the restraint from typical shrinkage during molding induces molded-in stress in the thermoplastic edge seal, causing a distortion of the cell during initial heat sterilization/sanitization cycles. The Southall patent recognizes that this is a characteristic of thermoplastic materials and discloses that the amount of polymer used during the injection molding process should be kept to a minimum to prevent excessive radial shrinkage of the edge seal and thereby decrease the tendency towards buckling.

It is well known in the art that the problem of cell buckling is exacerbated during hot wash cycles in which filtration cells are subjected to temperatures in excess of about 180° F. During hot wash cycles, as the cell-type filter assemblies are heated and the filter media wet out, differential expansion coefficients between the thermoplastic components of the cell and the cell media result in increased compressive stresses in the media elements, further increasing the tendency towards buckling. During the period of time following a hot wash cycle, commonly referred to as the post flush period, the thermoplastic edge seal cools to room temperature and thus contracts radially inwardly while the cellulosic media elements, still wet, remain swollen in an expanded state. Consequently, there is an interference generated and an increased tendency towards buckling.

It would be beneficial, therefore, to provide a lenticular filtration cell with a molded thermoplastic edge seal which does not impose excessive compressive forces on the cell media once cooled after injection molding, during hot wash cycles, or during post flush periods.

SUMMARY OF THE INVENTION

The subject invention is directed to a lenticular filtration cell of the type having two filtration media elements, which optionally may be in the form of discs, a spacer element interposed, and joined at the outer peripheries thereof by a thermoplastic edge seal during an injection molding process. The media elements are formed from a cellulosic material and the spacer element is formed from a thermoplastic material which serves to maintain the structural integrity of the filtration cell.

In accordance with the subject invention, the thermoplastic material from which the edge seal is formed during the injection molding process has a relatively low modulus of elasticity, as compared to other thermoplastic materials, such as, for example, polypropylene, polysulfone and nylon. Therefore, the filtration cell is significantly less prone to media buckling than prior art cell-type filter assemblies as a consequence of stresses induced by the injection molding process, or those which are induced during a hot flush period in which the cell media and edge seal expand due to liquid absorption and elevated temperatures, or those which are induced during a post flush period in which the edge seal tends to contract as it cools while the cell media remains in an expanded state due to fluid absorption.

One aspect of the present invention includes a fluid filter cell comprising: at least two filtration media elements; a separator element operatively positioned between the at least two filtration media elements; and an edge seal operatively connecting the at least two filtration elements and the separator element together, the edge seal being formed from a material having a modulus of elasticity sufficient to enable the edge seal to expand when the filtration media elements expand while maintaining an effective seal there between.

Another aspect of the present invention includes in a fluid filtration cell including a separator disposed between two media elements having outer peripheries which are secured together by an edge seal, the media elements having a first set of dimensional characteristics in a dry state and a second set of dimensional characteristics in a wet state, the improvement comprising: an edge seal formed from a thermoplastic material which expands and contracts in response to changes in the dimensional characteristics of the media elements while maintaining an effective seal between the two media elements.

Yet another aspect of the present invention includes in a fluid filtration cell including a separator disposed between two media elements having outer peripheries which are secured together by an edge seal, the media elements being formed from a material which swells in size due to fluid absorption, the improvement comprising: an edge seal formed from a thermoplastic material having a modulus of elasticity which is sufficient to permit radial expansion of the edge seal when the cell media swells in size.

And yet another aspect of the present invention includes in a fluid filtration cell including a separator disposed between two media elements having outer peripheries which are secured together by an edge seal, the media elements being formed from a material which swells in size due to fluid absorption, the improvement comprising: an edge seal formed from a thermoplastic material having a modulus of elasticity which is sufficiently low to enable the edge seal to comply with the forces exerted thereupon by the media elements as the media elements swell in size.

Further features of the subject invention will become more readily apparent to those having ordinary skill in the art from the following description of the invention taken in conjunction with the drawings.

BRIEF DESCRIPTION OF THE DRAWINGS

So that those having ordinary skill in the art to which the subject invention pertains will more readily understand how to construct a filter cartridge in accordance with the subject invention, a preferred embodiment of the apparatus of the subject invention will be described in detail herein below with reference to the drawings wherein:

FIG. 1 is a perspective view of a representative fluid filtration apparatus having a two-part cylindrical housing;

FIG. 2 is a perspective view of the fluid filtration apparatus of FIG. 1 with a portion of the side wall of cylindrical housing broken away to show a plurality of axially aligned lenticular filtration cells disposed therein;

FIG. 3 is a perspective view of a plurality of axially aligned lenticular filtration cells constructed in accordance with a presently preferred embodiment of the present invention;

FIG. 4 is a cross-sectional view of a representative lenticular filtration cell taken along line 4—4 of FIG. 3;

FIG. 5 is an enlarged localized view of the radially outer portion of the lenticular filtration cell illustrated in FIG. 4, in cross-section, with the media elements of the filtration cell shown in a dry or contracted state; and FIG. 6 is an enlarged localized view of the radially outer portion of the lenticular filtration cell illustrated in FIG. 4, in cross-section, with the media elements of the filtration cell shown in a wet or expanded state and the filtration cell in a radially expanded condition.

DETAILED DESCRIPTION OF THE PREFERRED EMBODIMENTS

In a preferred embodiment of the subject invention, the flitration media elements have a first set of dimensional characteristics in a dry state and a second set of dimensional characteristics in a wet state, and the edge seal is formed from a thermoplastic material which expands and contracts in response to changes in the dimensional characteristics of the media elements.

In another preferred embodiment of the subject invention, the filtration media elements are formed from a material which swells in size due to fluid absorption, and the edge seal is formed from a thermoplastic material having a modulus of elasticity which is sufficient to permit corresponding radial expansion of the edge seal when the cell media swells in size and corresponding contraction if the cell shrinks upon drying.

In still another preferred embodiment of the subject invention in which the media elements are formed from a material which swells in size due to fluid absorption, the edge seal is formed from a thermoplastic material having a modulus of elasticity which is sufficiently low to enable the edge seal to comply with the forces exerted thereupon by the media elements as the media elements swell in size.

Preferably, the thermoplastic material for which the edge seal of the subject invention is formed is a polypropylene and EPDM blend, such as, for example Santoprene® thermoplastic rubber. Preferably the polypropylene/EPDM blend has a hardness of about 50 shore A to about 60 shore D, more preferably of about 70 shore A to about 50 shore D, and yet more preferably about 80 shore A to about 40 shore D. Preferably the tensile modulus of elasticity of the blend at about 73° F. is about 600 psi to about 35,000 psi, more preferably about 2300 psi to about 27,000 psi, and yet more preferably about 4700 psi to about 19,000 psi. The presently preferred tensile modulus of elasticity of the blend at about 212° F. is about 300 psi to about 10,000 psi, more preferably about 800 psi to about 5,000 psi and more preferably about 1300 psi to about 2,000 psi. The preferred modulus of elasticity of the blend at about 250° F. is about 200 psi to about 5,000 psi, more preferably about 300 psi to about 3,000 psi, and yet more preferably about 400 psi to about 1000 psi. For example, Santoprene® grade 271-87, which has found to be particularly useful, has the following characteristics: a hardness of about 87 Shore A; a modulus of elasticity of about 16,400 psi at approximately 73° F.; a modulus of elasticity of about of about 1340 psi at approximately 212° F.; a modulus of elasticity of about 790 psi at approximately 257° F.; and a solidification temperature of approximately 208° F. Other forms of Santoprene® thermoplastic rubber, with similar mechanical characteristics may also suffice in the present invention.

Referring now to the drawings wherein like reference numerals identify similar structural elements of the subject invention, there is illustrated in FIG. 1 a fluid filtration system constructed in accordance with a preferred embodiment of the subject invention and designated generally by reference numeral 10. As illustrated in FIG. 2, filtration system 10 includes a representative cylindrical pressure vessel 12 which houses a representative lenticular. filtration assembly 14 having a plurality of axially stacked fluid filtration cells.

Referring to FIG. 3, there is illustrated a portion of filtration assembly 14 which includes, among other elements represented, axially stacked filtration cells 16, 18, and 20. As best seen in FIG. 4, each filtration cell of assembly 14 includes an upper filter media element 22 having an inner surface 22a and an outer surface 22b, and a lower filter media element 24 having an inner surface 24a and an outer surface 24b. A separator element 26 is operatively positioned between the inner surfaces, 22a, 24a, of the upper filter media element 22 and the lower filter media element 24 to maintain the structural integrity or stiffness of the filtration cell 16. The separator is presently preferably formed from polypropylene and conventionally includes a plurality of ribs (not shown) which extend between a radially outer rim and a radially inner hub, as disclosed, for example, in U.S. Pat. No. 4,783,262 to Ostreicher et al., the disclosure of which is herein incorporated by reference. As best seen in FIG. 4, the inner hub 28 of separator 26 includes a plurality of apertures to facilitate the flow of filtered fluid into the axial core 13 of the filtration assembly 14.

Each of the filtration cells, 16, 18, and 20 is constructed during a manufacturing procedure which includes the operative placement of the upper and lower media elements 22, 24 and interposed separator 26 into a mold, and subsequently injecting a thermoplastic material having ultimately desirable mechanical characteristics into the mold to form an edge seal 30 about the outer periphery of the cell media elements 22, 24. During the injection molding process, compressive forces are exerted upon the filtration cell, 16, 18, 20, to maintain the outer peripheral portions of the cell media elements, 22, 24, in contact at their inner surface (See FIG. 5).

Referring to FIGS. 3 and 4, optionally operatively found on edge seal 30 are a plurality of circumferentially spaced apart tabs 32 which project axially from the upper surface of the edge seal 30 of each filtration cell, 16, 18, 20, for maintaining the axial spacing therebetween. Tabs 32 are presently preferably formed monolithic with the edge seal 30 during the injection molding process. The specific injection mold used to form the edge seal 30 includes provisions for such tab structures.

It is well known, that the injection molding process employed in the fabrication of lenticular filtration cells induces fabrication stresses in the cell media layers, 22, 24, as well as in the thermoplastic edge seal, 30, as the edge seal 30 cools to room temperature following the injection molding process. It is also well known, that post fabrication stresses in the edge seal of a filtration cell tend to cause the cell media layers, 22, 24, to buckle in a vertical plane when used in filtration operations, particularly during hot flush cycles in which heated water is forced through the filtration system to sanitize the filtration system, causing the cell media layers, 22, 24, to swell in size due to fluid absorption. It is also well known, that stresses are imparted upon the cell media layers by the edge seal 30 during the post flush period during which the filtration cell, including the edge seal, cools to room temperature, while the cell media layers remain in an expanded state due to fluid absorption. In a filtration cell constructed with an edge seal formed from a thermoplastic material having a relatively high elastic modulus, i.e., a material which does not comply to forces exerted by the cell media when in an expanded state due to fluid absorption, such as, for example, polypropylene, it has been recognized that there is a significant tendency toward media layer/element buckling.

A test was conducted to analyze the problem of filter element buckling during the hot flush cycle and subsequent post flush periods. The test involved a computer finite element analysis which compared lenticular filter cells having edge seals formed from four different materials of construction: polypropylene (Phillips 66, Marlex™); a thermoplastic elastomer comprising polypropylene/EPDM (Advanced Elastomers, Santoprene® (201-73)); Polysulfone (Amoco, Udel™ P1700); and nylon 6/6 (Dupont, Zytel™ 101). As shown in the table below, the analysis established that filtration cells prepared with edge seals formed from polypropylene, polysulfone, or nylon are relatively more prone to media buckling during the hot flush cycle period than those filtration cells prepared with edge seals formed from Santoprene® rubber. Tables 1 through 5 provide comparative data relating to the mechanical characteristics of each of the tested materials.

TABLE 1

Stiffness Characteristics of Polypropylene (Phillips 66, Marlex ™)

| Temperature (° F.) | Elastic Modulus (psi) |
|---|---|
| 73 | 3.2 e5 |
| 180 | 1.4 e5 |

TABLE 2

Stiffness Characteristics of Thermoplastic Elastomer (Advanced Elastomers, Santoprene ® 201-73)

| Temperature ° F. | Elastic Modulus (psi) |
|---|---|
| 73 | 2300 |
| 212 | 840 |
| 257 | 280 |

TABLE 3

Stiffness Characteristics of Polysulfone (Amoco Udel ™ P1700)

| Temperature ° F. | Elastic Modulus (psi) |
|---|---|
| 70 | 3.90 e5 |
| 200 | 3.65 e5 |
| 300 | 3.15 e5 |

TABLE 4

Stiffness Characteristics of Nylon 6/6 (Dupont Zytel ™ 101)

| Temperature ° F. | Elastic Modulus (psi) (Dry) | Elastic Modulus (psi) (50% Humid) |
|---|---|---|
| 70 | 4.1 e5 | 1.75 e5 |
| 170 | 1.0 e5 | 0.82 e5 |
| 250 | 0.78 e5 | 0.60 e5 |

TABLE 5

Mechanical Characteristics of Materials Compared in Simulation

| Edge Seal Material | Solidification Temp. (° F.) | Expansion Coefficient (in/in/° F.) |
|---|---|---|
| Polypropylene | 250 | 2.1 e-5 |
| Santoprene | 208 | 1.18 e-4 |
| Polysulfone | 371 | 3.1 e-5 |
| Nylon 6/6 | 491 | 4.5 e-5 |

The computer simulation included a finite element model of a filtration assembly including two media elements, a separator, and an edge seal. The analysis procedure was designed to accurately simulate the manufacturing history of a filter element, from assembly to mold cooling, and through hot-flush to the post-flush cooling period. The procedure included the following simulated steps: 1) expanding the edge seal thermally to allow media closure; 2) closing the media elements by the application of axial edge pressure; 3) contracting the edge seal to capture the edge of the cell media elements; 4) removing the media closure pressure; 5) cooling the edge seal from mold temperature to room temperature to induce fabrication stresses therein; 6) heating the filter assembly while applying a slight lateral pressure to simulate the hot flush cycle, and including media water absorption as a thermal expansion effect; and 7) cooling the edge seal while retaining wet media components to simulate the post flush period.

TABLE 6

Radial Displacement of Filtration Cell

| Edge Seal Material | Post Fabrication | Hot Flush | Post Flush |
|---|---|---|---|
| Polypropylene | −.025 in | −.011 in | −.023 in |
| Thermoplastic Elastomer | −.008 in | .051 in | .036 in |
| Polysulfone | −.049 in | −.029 in | −.047 in |
| Nylon 6/6 (Dry) | −.097 in | N/A† | N/A† |
| Nylon 6/6 (Humid) | −.098 in | N/A† | N/A† |

†radial displacement value not calculable due to unpredictable buckling

Table 6 sets forth the calculated values of the radial displacement of the filtration cells derived from the computer simulation. Table 6 establishes that the radial displacement of a filtration cell having an edge seal formed from Santoprene® thermoplastic elastomer subsequent to fabrication, i.e., after cooling to room temperature following the injection molding process, is significantly lower than that of the filtration cells having edge seals formed from either polypropylene, polysulfone, or nylon 6/6 in both a dry state and a humid state. The computer simulation further establishes that the radial displacement of a filtration cell having an edge seal formed from Santoprene® thermoplastic elastomer and a cell media comprising cellulose, diatomaceous earth and a binder, during a hot wash cycle i.e., when the cell media expands due to fluid absorption and the cell is subjected to elevated temperatures, is positive, while that of the filtration cells having edge seals formed from either polypropylene or polysulfone is negative, indicating that the Santoprene® thermoplastic elastomer edge seal expands in conjunction with the cell media during the hot flush cycle.

FIGS. 5 and 6 are enlarged localized views of the outer portion of the lenticular filtration cell illustrated in FIG. 4, in cross-section and illustrate the change in dimensional characteristics of a filtration cell 20, having a separator 28 and an edge seal 30 constructed from Santoprene® thermoplastic elastomer from a dry state (FIG. 5) to wet state (FIG. 6) during a hot flush cycle. As illustrated, when the cell media elements 22 and 24 swell in size due to fluid absorption, together with the compliant edge seal 30, the radius of filtration cell 20 increases by a distance "x".

The computer simulation further established that the radial displacement of a filtration cell having an edge seal formed from Santoprene® rubber during the post flush period, ie., when the filtration cell cools to room while the cell media remained in an expanded state due to fluid absorption, is once again positive, while that of the filtration cells having edge seals formed from either polypropylene or polysulfone is negative, indicating that the Santoprene® rubber edge seal remains in an expanded condition even after cooling. This result is attributable to the modulus of elasticity of the Santoprene® rubber, which is low enough to permit the edge seal to comply with the forces exerted by the radially expanded cell media.

In actual lab testing, sample filtration cells were sealed on the edge with either polypropylene alone or Santoprene® alone. Such filtration cells were subsequently exposed to a hot water flush (80° C.). The filtration cells which had their edges sealed with polypropylene alone demonstrated significant and noticeable buckling and distortion of the cells within one hot water flush. On the other hand, those filtration cells which had their edges sealed with either Santoprene® 271-73 (hardness: 73 Shore A) or 273-40 (hardness: 40 Shore D) were found to demonstrate no significant buckling or distortion of the cells after five hot water flushes. Furthermore, the latter filtration cells showed no significant buckling or distortion even when further exposed to about 121° C. steam sterilization cycle.

In short, the elastomeric edge seal of the present invention was found to eliminate the gross distortion which occurred with the exact cartridge construction with the polypropylene edge. The elastomer was found not only to eliminate the typical post thermal exposure shrinkage, but actually expanded in diameter to compensate for the media swelling to maintain an appreciably flat cell. A low elastic modulus was found to allow the filtration media to move "like a rubber band", the edge diameter returning to its original dimension after the cell had dried. The Santoprene® grade 273-40 was preferred because it improved the media to elastomer seal bond and was felt to have a better reverse pressure capability than the lower durometer elastomer. By providing a higher modulus/durometer than the Santoprene® grade 271-73, it also provided more stiffness, permitting better handling in manufacturing.

Although the fluid filtration cell of the subject invention has been described with respect to a preferred embodiment, it is apparent that modifications and changes can be made thereto without departing from the spirit and scope of the invention as defined by the appended claims.

What is claimed is:

1. A disc-shaped fluid filter cell comprising:
   at least two filtration media elements comprising a cellulosic material;
   a separator element operatively positioned between the at least two filtration media elements; and
   an edge seal structure operatively connecting the at least two filtration elements and the separator element together, the edge seal structure being formed from a material having a tensile modulus of elasticity of about 600 psi to about 35,000 psi at about 73° F. and of about 300 psi to about 10,000 psi at about 212° F.

2. The disc-shaped fluid filter cell of claim 1 wherein the material of the edge seal structure has a tensile modulus of elasticity from about 2300 to about 27,000 psi at about 73° F. and about 800 to about 5,000 psi at about 212° F.

3. The disc-shaped fluid filter cell of claim 1 wherein the material of the edge seal structure has a tensile modulus of elasticity from about 4700 to about 19,000 psi at about 73° F. and about 1300 to about 2,000 psi at about 212° F.

4. The disc-shaped fluid filter cell of claim 1, wherein the material of the edge seal has a hardness of about 87 shore A, a modulus of elasticity of about 16,400 psi at 73 degrees F., a modulus of elasticity of about 1340 psi at approximately 212 degrees F., and a modulus of elasticity of about 790 psi at approximately 257 degrees F.

5. A disc-shaped fluid filter cell comprising:
   at least two filtration media elements having outer peripheries, the media elements being formed from a cellulose material which swells in size due to fluid absorption;
   a separator element operatively positioned between the at least two filtration media elements; and
   an edge seal structure operatively connecting the at least two filtration elements and the separator element together, the edge seal structure being formed from a material having a tensile modulus of elasticity of about 4700 psi to about 19,000 psi at about 73° F. and of about 1300 psi to about 2,000 psi at about 212° F.

6. The disc-shaped fluid filter cell of claim 5, wherein the material of the edge seal is a thermoplastic rubber having a hardness of about 87 shore A, a modulus of elasticity of about 16,400 psi at 73 degrees F., a modulus of elasticity of about 1340 psi at approximately 212 degrees F., and a modulus of elasticity of about 790 psi at approximately 257 degrees F.

7. A disc-shaped fluid filter cell comprising:

at least two filtration media elements having outer peripheries comprising a material that swells in size due to fluid absorption;

a separator element operatively positioned between the at least two filtration media elements; and an edge seal structure operatively connecting the at least two filtration elements and the separator element together, the edge seal structure being formed from a material having a tensile modulus of elasticity which is sufficiently low to enable the edge seal structure to comply with the forces exerted thereupon by the media elements as the media elements swell in size, wherein the material of the edge seal has a tensile modulus of elasticity from about 600 psi to about 35,000 psi at about 73 degrees F. and of about 300 psi to about 10,000 psi at about 212 degrees F.

8. The disc-shaped fluid filter cell of claim 7 wherein the material of the edge seal structure has a tensile modulus of elasticity from about 2300 to about 27,000 psi at about 73° F. and about 800 to about 5,000 psi at about 212° F.

9. The disc-shaped fluid filter cell of claim 7 wherein the material of the edge seal structure has a tensile modulus of elasticity from about 4700 to about 19,000 psi at about 73° F. and about 1300 to about 2,000 psi at about 212° F.

10. The disc-shaped fluid filter cell of claim 7, wherein the material of the edge seal is a thermoplastic rubber having a hardness of about 87 shore A, a modulus of elasticity of about 16,400 psi at 73 degrees F., a modulus of elasticity of about 1340 psi at approximately 212 degrees F., and a modulus of elasticity of about 790 psi at approximately 257 degrees F.

11. A disc-shaped fluid filter cell comprising:

at least two filtration media elements having outer peripheries comprising a cellulose material, the media elements having a first set of dimensional characteristics in a dry state and a second set of dimensional characteristics in a wet state;

a separator element operatively positioned between the at least two filtration media elements; and a molded edge seal structure operatively connecting the at least two filtration elements and the separator element together, the edge seal structure being formed from a material having a tensile modulus of elasticity of about 600 psi to about 35,000 psi at about 73° F. and of about 300 psi to about 10,000 psi at about 212° F., the molded edge seal structure expanding and contracting in response to changes in the dimensional characteristics of the two media elements while maintaining an effective seal between the two media elements.

12. The disc-shaped fluid filter cell of claim 11 wherein the material of the molded edge seal structure has a tensile modulus of elasticity from about 2300 to about 27,000 psi at about 73° F. and about 800 to about 5,000 psi at about 212° F.

13. The disc-shaped fluid filter cell of claim 11 wherein the, material of the molded edge seal structure has a tensile modulus of elasticity from about 4700 to about 19,000 psi at about 73° F. and about 1300 to about 2,000 psi at about 212° F.

14. The disc-shaped fluid filter cell of claim 11, wherein the material of the edges seal is a thermoplastic rubber having a hardness of about 87 shore A, a modulus of elasticity of about 16,400 psi at 73 degrees F., a modulus of elasticity of about 1340 psi at approximately 212 degrees F., and a modulus of elasticity of about 790 psi at approximately 257 degrees F.

* * * * *